US006701361B1

(12) United States Patent
Meier

(10) Patent No.: US 6,701,361 B1
(45) Date of Patent: Mar. 2, 2004

(54) ENHANCED MOBILITY AND ADDRESS RESOLUTION IN A WIRELESS PREMISES BASED NETWORK

(75) Inventor: Robert C. Meier, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 09/183,767

(22) Filed: Oct. 30, 1998

Related U.S. Application Data

(63) Continuation-in-part of application No. 08/916,601, filed on Aug. 22, 1997.
(60) Provisional application No. 60/024,648, filed on Aug. 22, 1996, and provisional application No. 60/043,395, filed on Apr. 2, 1997.

(51) Int. Cl.[7] .............................. H04J 3/24; G06F 15/16
(52) U.S. Cl. ....................... 709/224; 709/225; 370/85.7
(58) Field of Search ............................ 370/85.7, 85.13; 709/201, 217, 203, 218, 221, 228, 224, 225; 455/412

(56) References Cited

U.S. PATENT DOCUMENTS

| | | | | |
|---|---|---|---|---|
| 5,159,592 A | * | 10/1992 | Perskin ........................ 370/85.7 |
| 5,410,543 A | * | 4/1995 | Seitz et al. ............... 370/85.13 |
| 5,533,029 A | * | 7/1996 | Gardner ....................... 370/94.1 |
| 5,544,222 A | * | 8/1996 | Robinson et al. .............. 379/58 |
| 5,564,070 A | * | 10/1996 | Want et al. ................. 455/53.1 |
| 5,572,528 A | | 11/1996 | Shuen ...................... 370/85.13 |
| 5,659,580 A | * | 8/1997 | Partyka ........................ 709/201 |
| 5,708,655 A | | 1/1998 | Toth et al. ................... 370/313 |
| 5,745,884 A | | 4/1998 | Carnegie et al. ............... 705/34 |
| 5,881,235 A | * | 3/1999 | Mills ........................... 709/221 |
| 5,943,692 A | * | 8/1999 | Marberg ...................... 711/203 |
| 5,946,615 A | * | 8/1999 | Holmes et al. .............. 455/412 |

FOREIGN PATENT DOCUMENTS

CA 2213984 2/1998

* cited by examiner

Primary Examiner—Ayaz Sheikh
Assistant Examiner—Khanh Quang Dinh

(57) ABSTRACT

A premises based wireless network having a multi-segment wired network and a plurality of wireless access points connected to the wired network. The wired network operates according to a wired network protocol which may be the Internet Protocol. Wireless terminals communicate with the wireless access points according to a wireless network protocol, inconsistent with the wired network protocol. Each of the wireless terminals has a wired network address corresponding to one of the wireless access points. Each wireless terminal also has an address according to the wired network protocol. As the wireless terminals roam throughout the premises, protocol tunnels route communications between wireless terminals, thereby preserving communications while roaming by allowing the wireless terminals to retain their wired network addresses during the ongoing communications. The wireless terminals are connected to wireless access points. These wireless access points are in turn linked by data link tunnels to a root access point for a subnet. The data link tunnels enable the root access point for a subnet to forward data to the wireless access points. The forwarded data is not bridged onto the particular subnet that connects the wireless access point and the root access point for that subnet.

34 Claims, 11 Drawing Sheets

ENHANCED MOBILITY AND ADDRESS RESOLUTION IN A WIRELESS PREMISES BASED NETWORK

CROSS-REFERENCES TO RELATED APPLICATIONS

The present case is a continuation in part of U.S. application Ser. No. 08/916,601, filed Aug. 22, 1997, pending, which is based on U.S. Provisional Application, Serial No. 60/024,648, filed Aug. 22, 1996, and on U.S. Provisional Application, Serial No. 60/043,395, filed Apr. 2, 1997, all of which are hereby incorporated herein by reference in their entirety.

BACKGROUND

1. Technical Field

The present invention relates generally to premises based wireless networks wherein wireless terminals roam between network segments and utilize address resolution techniques for data packet routing purposes; and, more particularly, it relates to techniques for enhancing the mobility of such wireless terminals within the wireless networks while minimizing wireless traffic for address resolution.

2. Related Art

Communication systems often include interconnected wired and wireless networks that together support communication within an enterprise. These communication systems typically include one or more wired networks that connect network elements such as workstations, servers and access points. Communication cells established by wireless access points (APs) provide links between network elements connected to the wired backbone and mobile terminals. Such communications often pass through both the wireless and wired networks.

Wired networks typically operate according to one or more communication protocols, or protocol stacks that were specifically designed with strategies to maintain and manage wired networks. Similarly, wireless networks have evolved with protocols and associated maintenance strategies to support mobile network nodes and other unique characteristics associated with wireless network. Thus, it is often difficult to merge wired and wireless networks together without degrading performance on either the wired or wireless network.

For example, in conventional installations, APs are used to bridge between the wired and wireless networks. However, higher level protocols operating in the wired networks often create problems for the wireless networks, especially in those wireless networks where terminals frequently roam. Specifically, when terminals that communicate with a first AP on one IP (internet protocol) segment of a wired LAN (local area network) roam to communicate with a second AP attached to a second IP segment of the wired LAN, ongoing communication may be lost due to the a need to reregister the roaming device on the second IP segment and unregister that device from the first IP segment. Thus, IP nodes cannot transparently roam to another IP subnet. Further, because the APs in different IP segments often reside adjacent one another, the roaming terminals frequently move back and forth between the cells, creating significant problems in the network.

SUMMARY OF THE INVENTION

In order to overcome the shortcomings described above and additional shortcomings, a wireless network according to the present invention includes a multi-segment wired network and a plurality of wireless access points connected to the wired network. The wired network operates according to a wired network protocol which may be the Internet Protocol. Wireless terminals communicate with the wireless access points according to the wired network protocol, inconsistent with the wireless network protocol. Each of the wireless terminals has a wired network address corresponding to one of the wireless access points. As the wireless terminals roam throughout the premises, protocol tunnels route communications between wireless terminals via the wired network, thereby preserving communications while roaming by allowing the wireless terminals to retain their wired network addresses during the ongoing communications. Such protocol tunnels are transparent to the wired network.

Additional functionality is provided through the use of data link tunnels that connect access points within a wireless network. The data link tunnels allow passage of data under the wired network protocol to wireless terminals operating under the wired network without extraneous overhead in a communications protocol.

DETAILED DESCRIPTION

Figure 1:
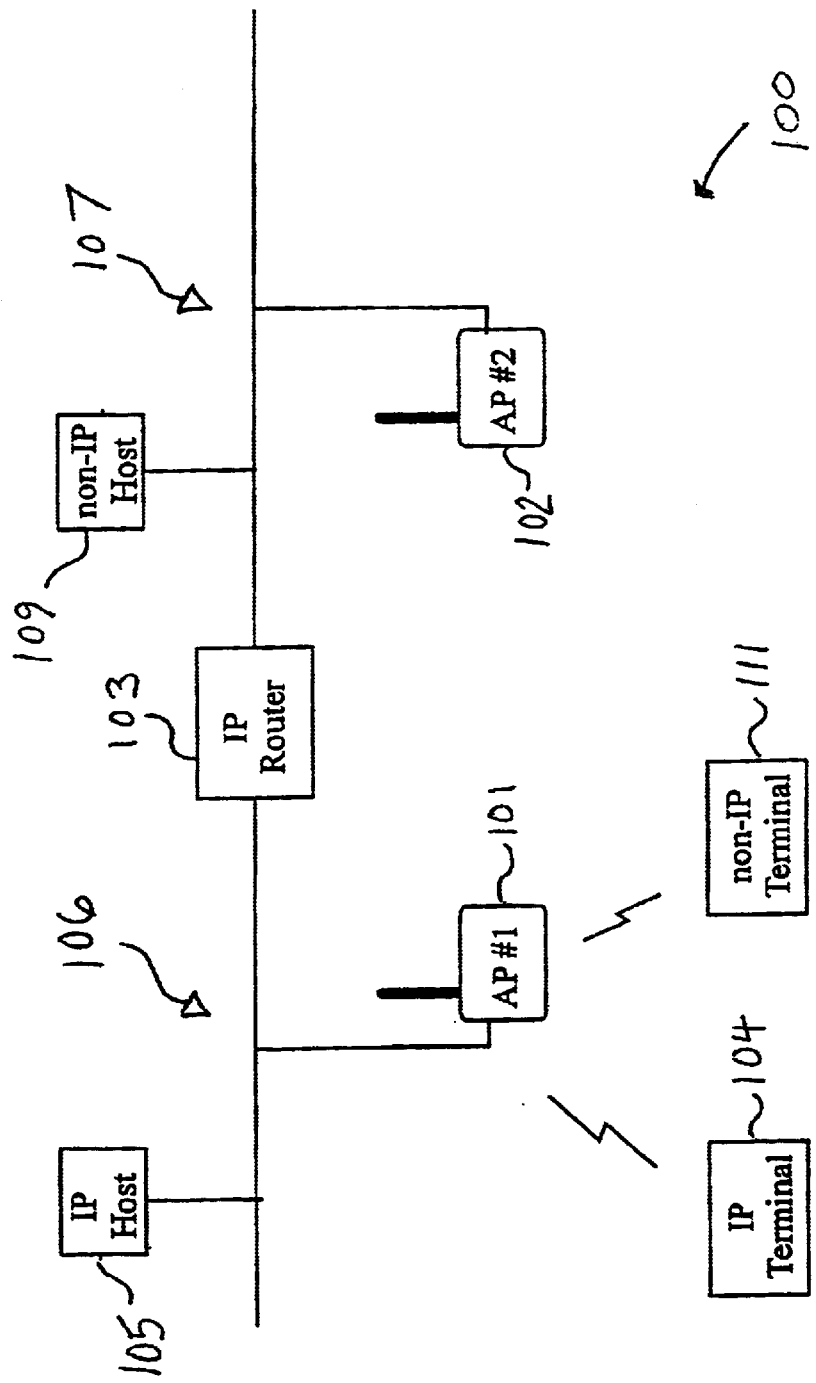
FIG. 1 is a drawing of an exemplary enterprise network built in accordance with the present invention utilizing tunneling to accommodate migration between IP network segments.

FIG. 1 is a drawing of an exemplary enterprise network 100 built in accordance with the present invention utilizing tunneling to accommodate migration between IP network segments. An enterprise as used herein refers to a business operation which may be self contained within a single premises or within multiple premises. For example, the enterprise network may be a wired and wireless network used within a single warehouse to support inventory control. It may also include support for mobile, vehicle based communication with such warehouse via a wide area network ("WAN"). Likewise, the enterprise might also include a second warehouse or manufacturing facility located near or remote to the warehouse with wired, satellite or WAN connectivity.

In particular, within the enterprise network 100 of FIG. 1, the protocols of the present invention, hereinafter referred to as OWL (open wireless local area network) protocols, support a variety of features which enhance mobile or portable terminal mobility while minimizing transmissions within the wireless networks. The OWL protocols function at the MAC (media access control) sub layer of the ISO (industry standards organization) protocol stack and allow the mobile network nodes (e.g., wireless terminals, printers, code readers, etc.) to roam from one wireless access point (OWL AP) to another in a manner which is transparent to higher layer protocols. The features of the present invention may be viewed as extensions to wireless network architectures such as those found in Appendix A entitled "OWL Network Architecture", Appendix B entitled "Open Wireless LAN Theory of Operation," Appendix C entitled "OWL Network Frame Formats," and Appendix D entitled "UHF/Direct Sequence MAC-D Protocol Specification."

The protocols of the present invention enable mobility across IP subnets for both IP and non-IP nodes, and enables non-IP nodes, on two or more IP subnets, to communicate as if connected by a single (possibly bridged) local area network. These protocols do not require any changes to an existing TCP/IP protocol stack in IP routers or mobile IP stations.

Without the protocols of the present invention an AP (access point) 101 and an AP 102 cannot belong to the same OWL network unless an IP router 103 is configured to bridge OWL frames (i.e. DIX type hex. 875C). Assume that an IP terminal 104 attached to the AP 101 is communicating with an IP host 105. The IP host 105 and the IP terminal 104 each have IP addresses for a subnet 106. If the IP terminal 104 attaches to the AP 102 (i.e. with a different LAN ID), then the IP host 105 cannot send packets to the IP terminal 104 because the IP router 103 would not forward packets within the subnet 106 to a subnet 107. A non-IP terminal 108 on the subnet 106 cannot communicate with a non-IP host 109 on subnet 107 unless the IP router 103 is configured to forward non-IP packets. However, with the protocols of the present invention, such and other problems are overcome.

Figure 2:
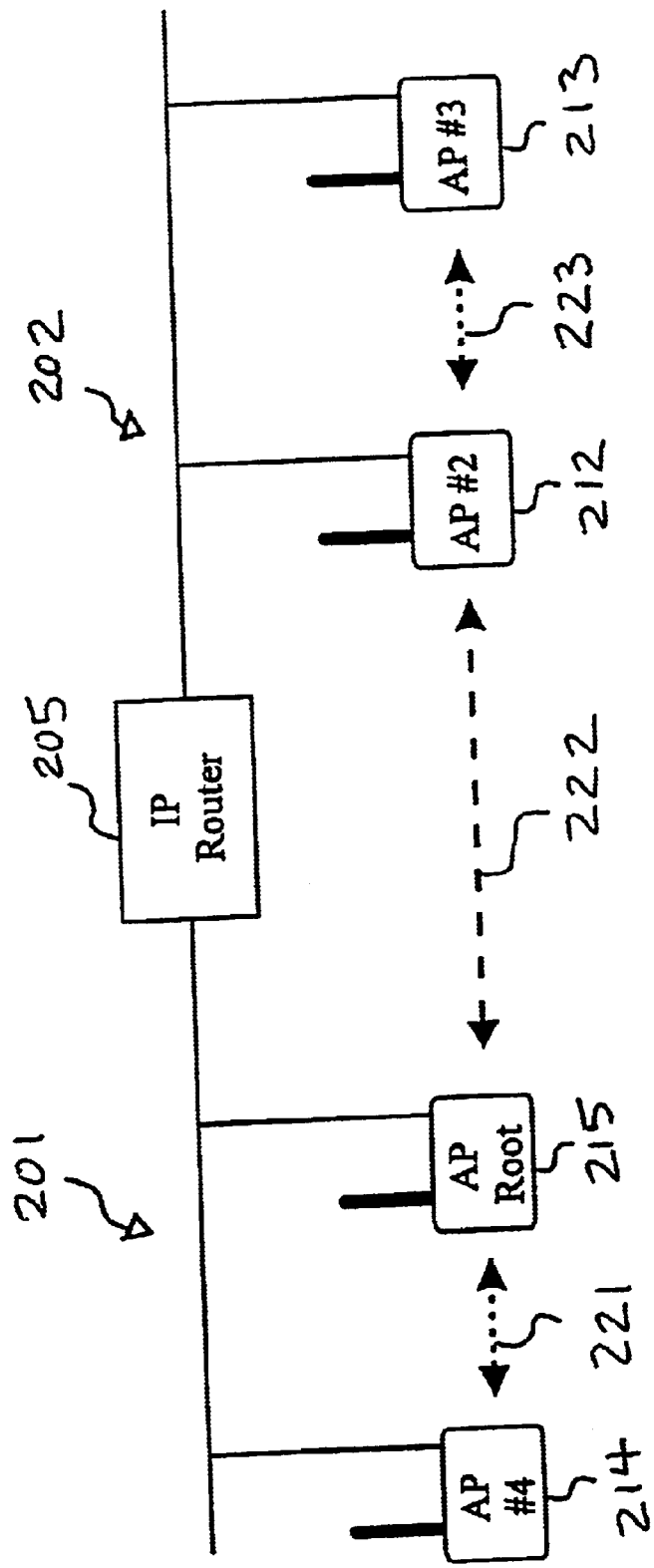
FIG. 2 is a drawing providing an exemplary illustration of access point interaction via an IP router to carry out IP tunneling in accordance with the present invention.

FIG. 2 is a drawing providing an exemplary illustration of access point interaction via an IP router to carry out IP tunneling. Features of the protocols of the present invention may be implemented by adding a logical port to an OWL access point (AP) which is, essentially, a port to an "IP tunnel". OWL packets and layer 2 data frames which are sent on the logical "IP port" are encapsulated inside of IP packets and sent through the tunnel. An IP tunnel exists between the IP port on an AP which "originates" the tunnel and an IP port on an AP which attaches to the OWL spanning tree through the "remote" end of the tunnel. The IP tunnel functions as a branch in the OWL spanning tree.

The user configures the IP tunnel port (i.e. with the bridge port menu) on an OWL AP. By default, the IP port is enabled so that an AP can attach to an OWL network through the remote end of an IP tunnel; the user can explicitly disable the IP port to prevent the AP from attaching through the tunnel. If the IP port is enabled, then the user can configure the port so that the AP will originate an IP tunnel. Typically only a small number of APs should be configured to originate an IP tunnel. If an IP port is configured to originate a tunnel, then a list of I or more IP addresses must be defined for the port. A type is entered for each address in the list. The type can be UNICAST, BROADCAST, or MULTICAST. The AP software places no restrictions on addresses in the list (other than the size of the list). The address list is selected so that IP packets destined to addresses in the list will be heard by APs which should attach to the OWL network through an IP tunnel. For example, in FIG. 1, an IP tunnel can be established between the AP 101 and the AP 102 by enabling the AP 101 to originate an IP tunnel and adding the IP address of the AP 102 to the address list associated with the IP port in the AP 101. The AP 101 and AP 102 are configured with the same OWL LAN ID.

An IP port can be configured so that it can only originate a tunnel if it assumes the root node status or if it becomes the designated AP for a secondary LAN.

A set of permanent filters and a set of user-defined filters are used to restrict flooding through an IP tunnel. The filters can be used, for example, to limit traffic through an IP tunnel to OWL frames and Norand Network Layer (NNL) frames. The permanent filters are used to prevent IP routing information packets and broadcast/multicast IP packets from passing through an IP tunnel. By default, only NNL packets, OWL packets, ARP packets, and unicast IP packets with a protocol type of UDP, TCP, or ICMP can pass through an IP tunnel. Some ICMP types and UDP/TCP protocol ports are also filtered, by default, to prevent IP routing information from passing through the tunnel. A "subnet filter" can be enabled if all mobile IP nodes belong to the same "root" subnet. Filters are discussed in more detail below.

The user can enable/disable a "proxy ARP server" or an "ARP translation server" (discussed below) and, optionally, create permanent ARP server entries. The user can also set a network wide parameter which prevents broadcast ARP requests from being forwarded to radio terminals and through IP tunnels. The parameter can be set so that no ARP requests are forwarded or only those which cannot be "resolved" by the particular ARP server.

Although the higher level protocols (e.g., such as that set forth in IEEE 802 standards) may prohibit a bridge from reordering (i.e. forwarded) frames, it is possible that frames forwarded through an IP tunnel may be reordered by the underlying network. The user can configure an IP port so that strict frame sequencing is enforced. If strict frame sequencing is enabled, then the IP port will insert a sequence number in outbound frames and cache address/sequence number pairs for inbound frames. Delayed frames which arrive out-of-order are simply discarded.

An IP port can be enabled on an AP configured with an IP address. If IP subnet addressing is used, then the AP should also be configured with an IP subnet mask.

An OWL IP tunnel is logically equivalent to any other physical link (i.e. radio link) in the OWL spanning tree. An OWL AP forwards a packet along a branch in the spanning tree by sending the packet to the MAC-D destination address of the next hop. The MAC-D addresses used on an IP port are IP addresses which identify the AP at each end of the tunnel. Note that the TCP/IP software in an AP is responsible for binding the IP address to the correct 802 LAN address (i.e. with ARP).

The root node and other attached OWL APs broadcast HELLO packets or "beacons" on each IP port and radio port once per HELLO period. The root node and designated APs also broadcast HELLO packets on ethernet links. If the port is an IP port, then a copy of the HELLO packet is created for each IP address in the user-defined list for the port. The MAC-D destination address, of the HELLO packet, is an IP address from the list, and the MAC-D source address is the IP address of the AP. If the destination IP MAC-D address in a HELLO packet is a multicast address, then the HELLO packet may be received by more than one AP. For example, an IP port on the root AP can be configured with the "all-subnets" address. In this case, no other configuration may be required, since all APs in an enterprise IP network, potentially, can receive HELLO packets addressed to the all-subnets address. (Note that IP routers must be enabled to forward packets addressed to the all-subnets address or a group address, if such an address is used.) As a second example, an IP port on the root AP can be configured with a list of unicast addresses, to limit HELLO propagation and/or to explicitly control which APs attach to the remote end of a tunnel.

The IP software in the AP binds the destination IP address in a HELLO packet to an ethernet address. If the IP address type is UNICAST, then the first hop on the path to the IP destination is derived from the IP route table in the AP. Note that the user can configure a default route and can also configure special routes for a specific IP address or group of addresses. If the type is BROADCAST, then the destination ethernet address is the ethernet broadcast address, hexadecimal FFFFFFFFFFFF. If the type is MULTICAST, then the HELLO packet is sent to a multicast ethernet destination address which is formed from the IP address according to RFC 1112. The first 3 bytes of the ethernet address are hex. 01005E and the last 23 bits are taken from the last 23 bits of the IP address.

OWL APs which are on an IP subnet which is different than the IP subnet of the OWL root node, can attach to the OWL spanning tree through an OWL IP port. The "cost" associated with an IP port is greater than the cost of an ethernet port, but less than the cost of a radio port. An unattached AP may receive HELLO packets on one or more ports. If the lowest cost path to the root node is through an IP port, then an AP will send an ATTACH request to the root node through the IP port. The MAC-D destination address of the ATTACH request is equal to IP address of the tunnel originator and the MAC-D source address is the IP address of the attaching AP. Note that the IP destination address is obtained from the MAC-D source address of a HELLO packet. The tunnel link is complete as soon as the attaching AP receives an ATTACH response on the IP tunnel port.

An AP which attaches through an IP tunnel link (or OWL radio link) can be the designated AP for a secondary OWL ethernet LAN. An AP can be the designated AP for a secondary LAN at a given time. More than one AP, attached to the same secondary LAN segment, may receive HELLO packets through an IP port (or radio port) if a multicast IP address is used or if two or more unicast addresses are defined (i.e. for redundancy). The protocol to elect the designated AP operates consistently whether the path to the parent AP is through an IP tunnel or radio link. The designated AP, for a secondary LAN, is always the parent of any other AP which can bridge frames to the secondary LAN segment.

More particularly, in FIG. 2, a subnet 201 is the OWL primary LAN. Further a subnet 202 is an OWL secondary LAN, and an AP 212 is the designated bridge for the secondary LAN 202. OWL spanning tree branches 221, 222 and 223 are denoted by dashed lines. The branch 222 from AP 212 to a root AP 215 is through an IP tunnel via an IP router 205, which was originated by the root AP 215. By default, an AP 213 can bridge frames onto subnet 202. Therefore, the AP 213 must attach to the OWL network through the designated AP for the subnet 202, i.e., the AP 212. An AP 214 is attached to the root AP 215 through an ethernet branch 221, rather than an IP tunnel branch, because the cost of an ethernet hop is lower. Similarly, ethernet branch 223 exists between the AP 212 and the AP 213.

A node in an OWL network is identified by its MAC-R address which is a 6-byte 802 (i.e. ethernet) address. A port on an OWL device is identified by a MAC-D address. The path to an OWL node is defined by the OWL spanning tree, which can be derived from routing tables stored in APs. The key to a routing table entry is a MAC-R 802 address. An AP forwards an outbound ethernet frame, for example, by looking up the destination ethernet address in a routing table. A MAC-D port address and local port ID, stored in the route table entry for the destination, define the first hop on the path to the destination. If the first hop is through an IP tunnel, then the MAC-D address is an IP address which identifies an IP port at the remote end of the tunnel. The IP MAC-D layer encapsulates the frame inside of an IP packet and forwards it to the remote IP port. The IP MAC-D layer in AP at the remote end of the tunnel removes the IP encapsulation and posts the frame to the MAC-R layer, which forwards the frame to its final destination.

The size of an encapsulated frame may exceed the maximum frame size for an ethernet link. The IP software in the AP is responsible for fragmenting and re-assembling packets which exceed the maximum ethernet frame size.

The MAC-D entity associated with an IP port on an AP passes a frame to the local IP stack for transmission. The IP stack formats the IP packets, binds the destination IP address to an ethernet address, and passes the frame to its data link layer interface for transmission. In an OWL AP, the data link layer interface for the IP stack exists on top of the OWL bridging layer. Therefore, the IP-encapsulated frame passes through the bridging layer and, possibly, through the MAC-R layer and a second MAC-D layer before it is transmitted on a physical port. The destination ethernet address of the IP-encapsulated frame should be the ethernet address of an IP router port attached to the local subnet. If the destination ethernet address is unknown, then the frame would normally be flooded. However, encapsulated frames, identified by the IP protocol type, are always passed to the ethernet MAC for transmission. Received encapsulated frames are discarded by the bridging layer, if the input source is not the ethernet MAC. This restriction prevents internal routing loops in the AP and prevents tunnels from existing on top of radio links. Note that the path cost would be distorted if an IP tunnel existed over a radio link.

Figure 3:
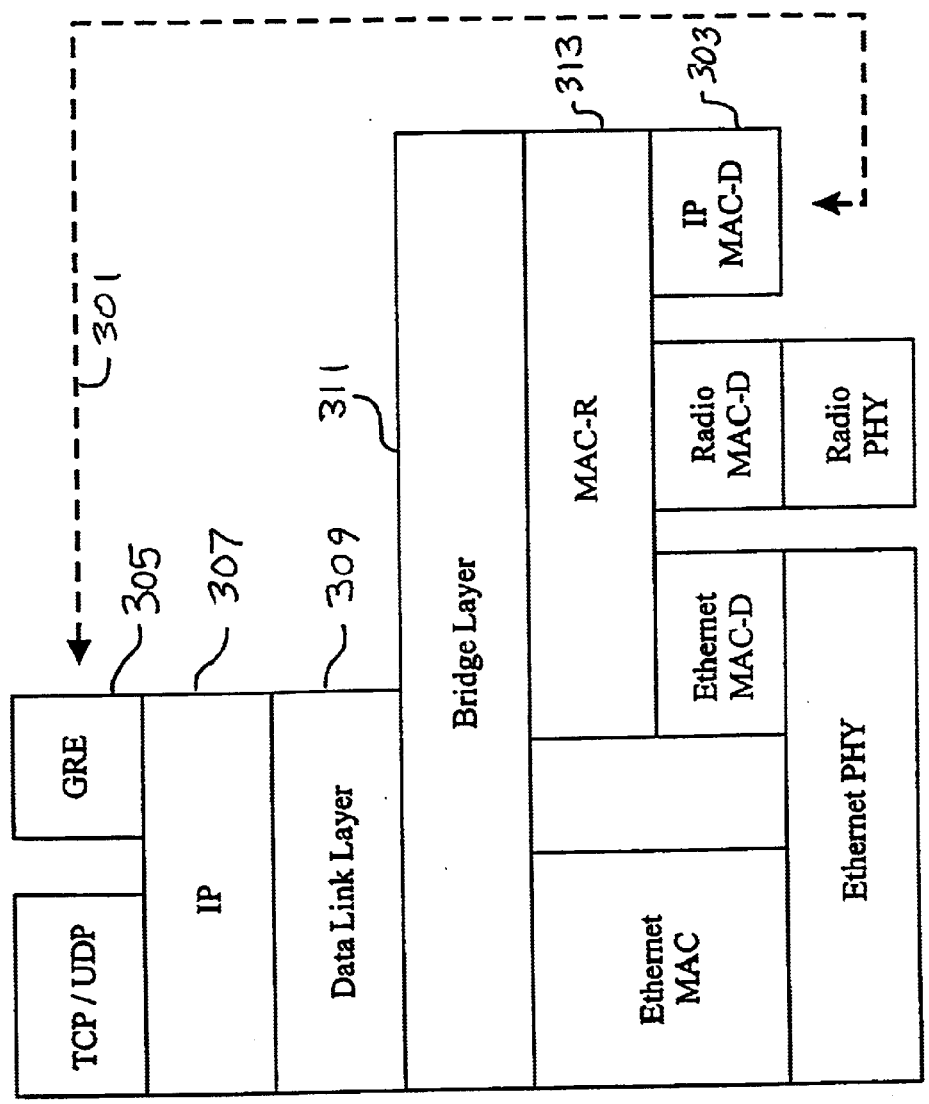
FIG. 3 is a drawing of an exemplary protocol stack used in an access point of the present invention such as one of those shown in FIGS. 1 and 2 which has an IP port.

FIG. 3 is a drawing of an exemplary protocol stack used in a access point of the present invention such as those shown in FIGS. 1 and 2 which has an IP port. A dashed line 301 between an IP MAC-D entity 303 and a GRE transport entity 305 logically represents a path through the protocol stack for IP-encapsulated frames. More particularly, this path flows between the GRE transport entity 305 the IP MAC-D entity 303 via an IP layer 307, a data link layer 309, a bridge layer 311 and a MAC-R entity 313. Descriptions regarding other pathways through the protocol stack may be found, for example, in Appendix B.

If the AP receives a frame and the destination is unknown, the frame may be flooded, depending on the configured flooding levels. Note that the destination of a multicast frame is never known. Frame flooding through an IP tunnel is consistent with flooding on any other link type. If multicast hierarchical flooding is enabled, for example, then multicast frames which originate in the radio network are forwarded inbound to the primary LAN. Multicast frames which originate on the primary LAN are flooded throughout the OWL network. The path to the primary LAN may include an IP tunnel.

Flooding through an IP tunnel can be reduced with a number of configuration options. As noted above, filters can be defined to prevent some types of frames from being forwarded.

Ethernet bridging can be disabled on selected OWL APs to prevent flooding across subnet boundaries. In FIG. 2, for example, if bridging is disabled on AP 2 and AP 3, then frames transmitted on subnet 2 will not be bridged into the OWL network, and, therefore, will not be flooded to subnet 1. Only frames received on radio ports will be forwarded inbound by AP 2 and AP 3.

If unicast hierarchical flooding (see OWL theory of operation) is enabled, then unicast frames transmitted on subnet 1, the primary LAN, will not be flooded to subnet 2, if the destination is unknown; however, unicast frames will be forwarded from subnet 1 to subnet 2 if the root AP has a route table entry for the destination and the first hop is through the IP tunnel link.

An AP will not forward a frame through an IP tunnel if the destination ethernet address identifies the default IP router port. An AP can determine the ethernet address of its default IP router port from its local ARP cache.

As used herein, a "mobile IP node" is any IP node that can roam across IP subnet boundaries. In an OWL network, each mobile IP node is configured with a single IP address, which defines its "home" IP subnet. In theory, any IP subnet(s) can be a home subnet for mobile nodes. In practice, the IP subnet which is attached to the OWL root node is the preferred home subnet for mobile IP nodes. In this case, the home subnet is equivalent to the OWL primary LAN. If the primary LAN is the same as the home subnet and mobile nodes communicate exclusively with stations on the primary LAN, then MAC-level flooding and triangular routing can be reduced or eliminated.

In an IP/ethernet network which uses subnet routing, a first IP node sends an IP packet to a second node on the same subnet by sending the IP packet to the ethernet address of the second node. If the second node is on another subnet, the first node sends the packet to the ethernet address of an IP router. The ethernet address is typically discovered with the ARP protocol. Since the destination MAC address of the IP packet is an ethernet address, the packet will be forwarded correctly in an OWL network.

If a mobile IP node (or mobile non-IP node) roams away from its home subnet and attaches to an AP on a "foreign" subnet, it must send an ATTACH request to the OWL root node before it can send or receive data frames. The ATTACH request fully establishes the path to the mobile node. For example, the AP at the home end of the IP tunnel, which links the home and foreign subnets, will create a route entry for the mobile node, which points to the tunnel as the first hop on the path to mobile node, when it receives the ATTACH request from the terminal. The key to the route entry is the ethernet address of the mobile node. If the AP receives an ethernet packet, with the destination ethernet address of the mobile node, then it will forward the encapsulated ethernet frame through the IP tunnel.

If a mobile IP node is attached to an AP on a foreign subnet, then it still responds to ARP requests which are transmitted on its home subnet. If multicast flooding is enabled, then broadcast ARP requests are flooded throughout the OWL network, including through OWL tunnel links. Therefore, the mobile node can receive the broadcast ARP request on the foreign subnet, and respond with a unicast ARP response, containing its ethernet address. Likewise, an ARP request from the mobile node will be flooded to the home subnet. Note that the target IP address, in an ARP request from the terminal, may designate either a target host or a router port on the node's home subnet. In either case, IP packets are forwarded through the OWL network to the node identified by the destination ethernet address.

Figure 4:
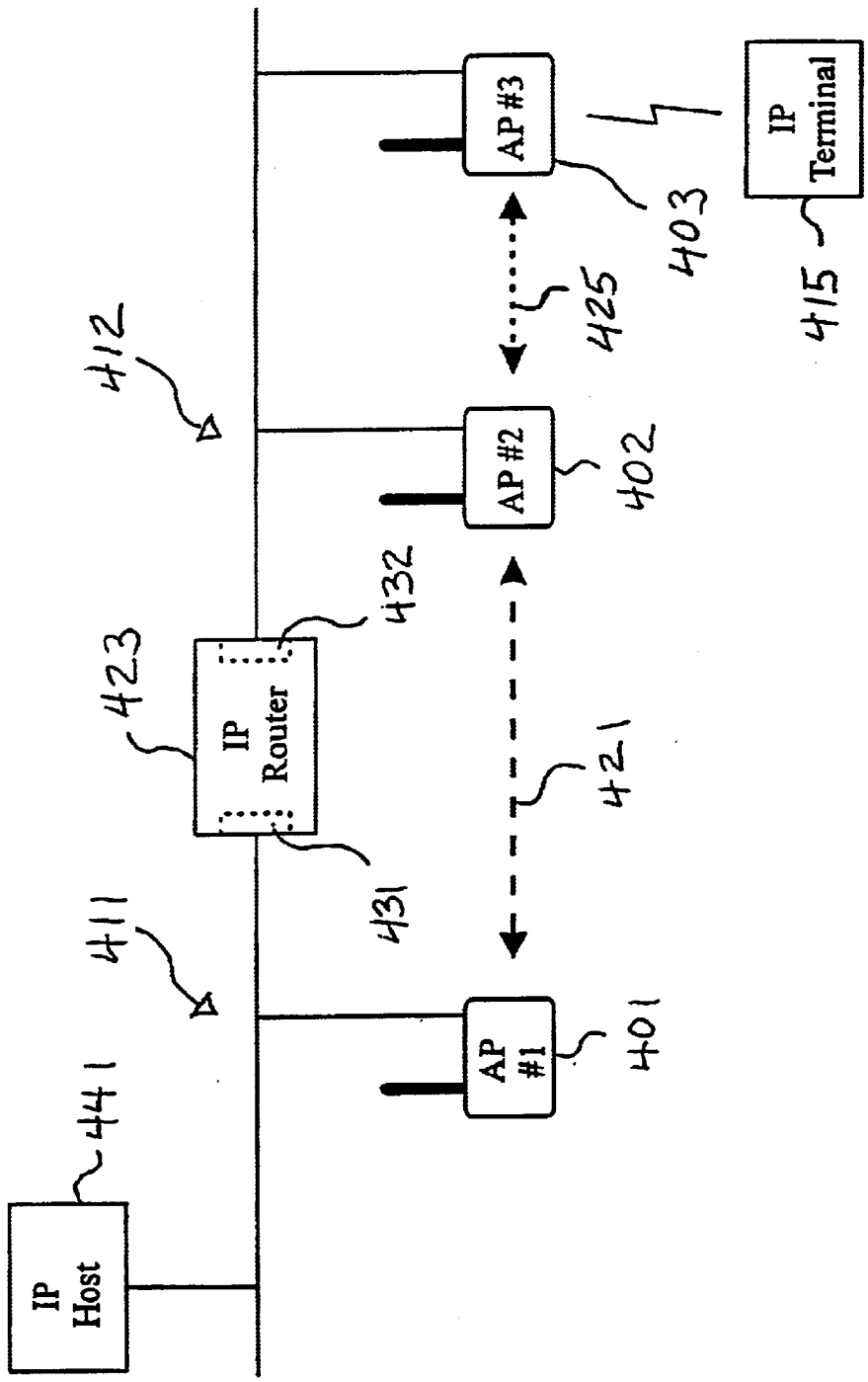
FIG. 4 is a drawing illustrating the operation of the present invention with a roaming IP terminal in an enterprise network built in accordance with the present invention.

FIG. 4 is a drawing illustrating the operation of the present invention with a roaming IP terminal in an enterprise network built in accordance with the present invention. As shown, a mobile IP terminal 415 has roamed from its home subnet, subnet 411, to an AP 403 on a subnet 412. The mobile IP terminal 401 may be any device which contains a radio transceiver such as a portable computing device, a code reader, a printer, digital camera, RF TAG, etc. An AP 401 serves as the OWL root node. An AP 402 is the designated AP for the secondary LAN which is the subnet 412. The AP 402 is attached to the AP 401 through an IP tunnel 421. The AP 403 is attached to the AP 402 through an ethernet link 425. Note that the physical path for the IP tunnel 421 between the AP 401 and the AP 402 is through an IP router 423. The IP router 423 has two ports, port 431 attaches to the subnet 411 while port 432 attaches to the subnet 412. The IP address for port 431 identifies subnet 411, while the IP address for port 432 identifies the subnet 412. The subnet 411 is the primary OWL LAN.

As a first example, assume that the terminal 415 has been actively communicating with an IP host 441 when it roams from the AP 401 to the AP 403. When the terminal 415 roams, it must send an ATTACH request to the root, and wait for a matching ATTACH response, before it can send or receive data frames. The ATTACH request causes the root to update its route table entry for the terminal so that the first hop port and MAC-D address are its IP port and the IP address of the AP 402, respectively. The AP 402 and the AP 403 also update their routing tables to reflect the new path. If the host 441 sends a packet to the terminal 415, the destination ethernet address is the ethernet address of the terminal 415. The packet will be routed to the terminal 415 via the tunnel 421. If the terminal 415 sends a packet to the host 441, the destination ethernet address will be the address of the host 441. The packet will be forwarded inbound until it reaches the primary LAN (the subnet 411), where it will be bridged and received by the host 441.

If the terminal 415 roams before it begins communicating with the host 441, it does not know the ethernet address of the host 441. Thus, the terminal 415 sends a broadcast ARP request which contains the IP address of the host 441 to determine the ethernet address of the host 441. The AP 403 bridges the ARP request onto the subnet 412. No IP node on the subnet 412 will respond to the ARP request because the target IP address does match any of the subnet 412 IP addresses. The AP 402 receives and forwards the ARP request inbound through the IP tunnel 421 to the AP 401. The AP 401 bridges the request onto the subnet 411, where it is received by the host 441. The ARP response is sent to the unicast address of the terminal 415. If the host 441 sends an ARP 441 request which contains the IP address of the terminal 415, then the ARP request can either be serviced by a proxy ARP server (i.e. in the AP 401) or flooded outbound through the IP tunnel 421 and to the terminal 415.

Figure 5:
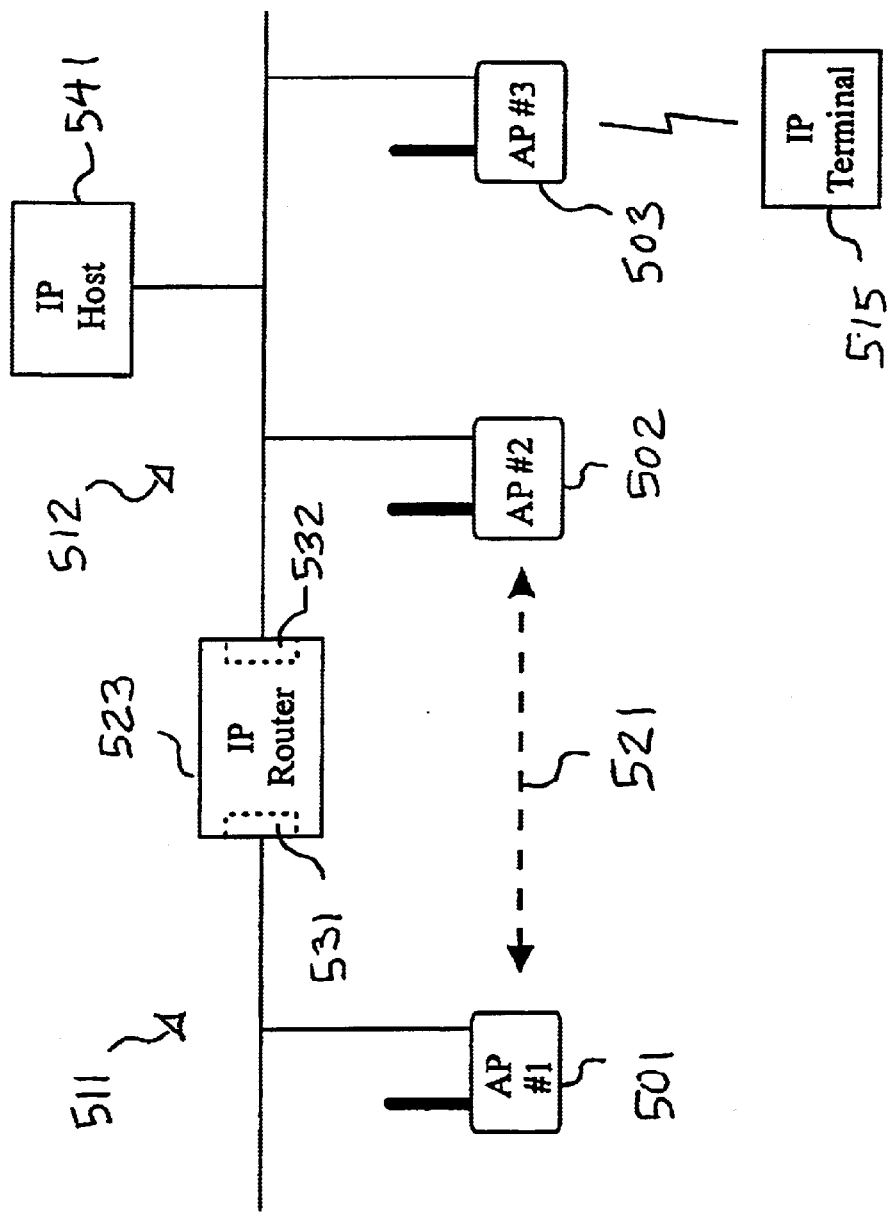
FIG. 5 is a drawing illustrating a variation from that of FIG. 4 used to illustrate further aspects in the enterprise network built in accordance with the present invention relating to roaming.

FIG. 5 is a drawing illustrating a variation from that of FIG. 4 used to illustrate further aspects in the enterprise network built in accordance with the present invention relating to roaming. The home subnet of an IP terminal 515 is a subnet 511. An IP router 523 has a port 531 which is the default router port associated with the subnet 511 and a port 532 associated with the subnet 512. The port 531 is the default router port for the terminal.515; and the port 532 is the default router port for an IP host 541.

Assume the terminal 515 was actively communicating with the host 541 when it roamed from an AP 501 to an AP 503. The host 541 is sending IP packets to the terminal 515 which have a destination ethernet address for the port 532 on the IP router 523. The terminal 515 is sending IP packets to the host 541 which contain the ethernet address of port 531 on the router 523. After the terminal 515 roams, it will continue to send packets with the ethernet address of the port 531. A packet from the terminal 515 will be bridged onto the subnet 512 by the AP 503. An AP 502 will receive and forward the packet inbound to the primary LAN. The AP 501 bridges the packet onto subnet 511, where it will be received by the router 523 on the port 531. The router 523 will forward the IP packet to the host 541 on subnet 512. A packet transmitted by the host 541 will be forwarded from the subnet 512 to the subnet 511 by the router 523. The AP 502 will not forward the packet, transmitted by the host 541, inbound to the AP 501 if it has learned that the port 532 on the router 523 is on the subnet 512. Otherwise, it will flood the (i.e. duplicate packet) packet to the subnet 511. Note that no ethernet adapter on the subnet 511 should receive the duplicate packet.

As before, ARP requests will be generated if the terminal 515 roams before communicating with the host 541 (or if ARP caches are aged). The terminal 515 will send an ARP request with the IP address of the port 531 as the target IP address. The ARP request will be forwarded inbound through the IP tunnel 521 and bridged onto subnet 511 by the AP 501, where it will be received by the router 523. The router 523 will send a unicast ARP response packet to the terminal 515 which contains the ethernet address of the port 531. The host 541 will send an ARP request with the IP address of the port 532 as the target IP address. The router 523 will send a unicast ARP response packet to the host 541 which contains the ethernet address of the port 532. Note that the router 523 will receive both ARP requests on both ports; however, it will (correctly) respond only to those ARP requests which match the port IP address. Also note that the AP 502 will learn that the ethernet address of the port 532 is on the local subnet when it sends an ARP response.

The OWL/IP protocols run on top of an IP "transport-layer" protocol defined in RFC 1701 entitled "Generic Routing Encapsulation (GRE) protocol." The IP protocol type for GRE is decimal 47. GRE is used to encapsulate a variety of non-IP network layer protocols (i.e. to route non-IP packets through an IP network). The GRE header is contained in 4 or more bytes. Two of the bytes contained in the GRE header contain the DIX type of the encapsulated protocol, which is hexadecimal 875C for OWL/IP. The general format of an OWL/IP frame transmitted as a DIX ethernet frame is shown below:

| Field | Size |
|---|---|
| Ethernet Destination Address | 6 bytes |
| Ethernet Source Address | 6 bytes |
| Ethernet Version 2 Type (hex. 800) | 2 bytes |
| IP Header (protocol = 47) | 20 bytes |
| GRE Flags | 2 bytes |
| GRE Type (hex. 875c) | 2 bytes |
| MAC-D Protocol ID | 1 byte |
| MAC-D Control | 1 byte |
| MAC-D OWL LAN ID | 1 byte |
| MAC-D Fragment ID | 1 byte |
| MAC-D Length | 2 bytes |
| MAC-R Control | 2 bytes |
| MAC-R 802 Destination Address | 6 bytes |
| MAC-R 802 Source Address | 6 bytes |
| MAC-R Parameters | M bytes |
| 802.3 Length or DIX Type | 2 bytes |
| LLC Header/Data | N bytes |

The first two bytes in the GRE header contain a flag which indicates if the GRE header contains an optional 4-byte sequence number. The sequence number can, optionally, be included if strict frame sequencing, through an IP tunnel, must be enforced.

Filters may be used to prevent unwanted frame forwarding through an OWL/IP tunnel. For example, such filters may operate to prevent forwarding of: (1) 802.1d bridge PDUs any OWL AP port; (2) IP packets with a broadcast or multicast ethernet address (preventing nodes on a remote IP subnet from receiving "bridged" IP packets, for example); (3) IP packets with protocol types such as EGP, IGP, IDPR, IDRP, MHRP, DGP, IGRP, and OSPFIGP; (4) IP ICMP packets except types such as Echo Request, Echo Reply, Destination Unreachable, Source Quench, Redirect, Alternate Host Address, Time Exceeded, Parameter Problem, Time Stamp, Time Stamp Reply, Address Mask Request, Address Mask Reply, and Trace Route; (ICMP types which include Router Advertisement, Router Selection, Mobile IP types, and IPv6 types may not be forwarded); and (5) IP/UDP or IP/TCP packets with source or destination protocol port numbers such as RIP, RAP, and BGP.

Similarly, a user can explicitly filter DIX types, however, as a default, only the following DIX types are forwarded: OWL (hex. 875C), NNL (hex. 875B), ARP (hex. 0806), and IP (hex. 0800). Further, IP protocols can also be filtered. But, as a default, the IP protocols ICMP(1), UDP(17), and TCP(6) are not filtered. All such filters may be modified or extended as proves desirable for a given enterprise network installation.

The user can also enable subnet filtering for IP networks which use subnet routing. Subnet filtering can be used if: a) all mobile nodes belong to the same subnet as the root AP—the "root subnet;" and b) the root AP initiates all IP tunnels. Servers/hosts can be on any subnet. If subnet filtering is enabled, an AP forwards IP packets inbound through an IP tunnel if the source IP address belongs to the remote subnet and the source ethernet address identifies a mobile node in the sub tree rooted at the AP. An AP forwards broadcast ARP packets (with an IP protocol type) inbound through an IP tunnel if the source IP address, in the ARP packet, belongs to the remote subnet and the source ethernet address identifies a mobile node in the sub tree rooted at the AP. This option can be used in conjunction with hierarchical unicast flooding to eliminate unnecessary IP packet forwarding and inbound ARP flooding. If the unicast hierarchical flooding option is used, then IP packets are not forwarded from the root subnet unless the destination is in the subtree below the root subnet. Note that multicast and broadcast IP packets are not forwarded. In addition, a proxy ARP server or an ARP translation server can be used to prevent ARP flooding.

An OWL AP functions as a transparent MAC layer bridge. A transparent bridge may flood a frame, received on one port, to all other ports, if the destination is unknown. In an OWL network, unicast frames may be flooded through an IP tunnel if flooding is enabled. As noted above, broadcast and multicast IP packets are not forwarded through an IP tunnel. In many cases, flooding through an IP port can be eliminated with the "subnet filter" option and the hierarchical unicast flooding option.

Occasionally, flooding through an IP tunnel may cause a duplicate IP packet to be delivered to another "remote" subnet. This can happen, for example, if an AP with an active IP port has not yet "learned" the ethernet address of a router port which is on the same "local" subnet as the AP. In this case, an IP packet addressed to the ethernet address of the router port may be flooded through the IP tunnel, by the AP, and also forwarded by the IP router. However, the packet flooded through the tunnel should not be received by any ethernet adapter attached to the remote subnet because the destination ethernet address designates the router port attached to the local subnet. It should be noted that IP does not provide "reliable" network layer services. Packets may be lost, duplicated, delayed, or delivered out-of-order.

An AP with an IP port may also occasionally flood IP packets to the wrong subnet(s), if the AP has not learned the destination address of a local host. Again, such packets should not be received by any ethernet adapter on the remote subnet(s).

In general, an AP should not forward a frame through an IP tunnel, if the destination ethernet address of the frame identifies a node on the local subnet. An AP uses "backward learning" to discover which ethernet addresses belong to nodes on the local segment. Learned addresses are stored in a "filtering database." Filtering database entries are aged and discarded if the node associated with an entry is not active for some period of time. An AP will not forward an ethernet frame, if it has learned that the destination is on the segment on which the frame was received. In an IP environment, packets destined for another subnet are always addressed to the ethernet address of a router port on the local subnet. Therefore, such packets are usually not forwarded (i.e. through an IP tunnel) by an AP.

In practice, IP nodes do not transmit IP packets, without first transmitting an ARP request and receiving an ARP response. ARP caches are typically aged, so ARP requests and responses are generated periodically for active nodes. Also, routers usually broadcast routing information packets periodically. In general, any periodic message will cause any AP on the local subnet to refresh its filtering database. Therefore, each AP on a subnet should have a fresh filtering database entry for each router port or host port attached to the subnet.

The following rules apply to typical OWL/IP protocol installations: (1) OWL/IP does not bridge across an IP router if the router is configured to bridge OWL frames (i.e. DIX type hex. 875C); (2) OWL/IP does not bridge frames across an IP router, for some network protocol type, if the router is also configured to bridge the network protocol type. For example, NNL frames should not be bridged through an IP tunnel, if any intermediate IP routers are configured to bridge NNL frames. Note that some routers (i.e. brouters) can be configured to bridge any frame type which cannot be routed; (3) OWL/IP should not be used to bridge frames with routable non-IP network layer types (e.g. OWL/IP should not be used to bridge Novell IPX frames in an environment which includes combined IP/IPX routers.); (4) As a rule, OWL/IP can be used to bridge frames with non-routable network layer types, where a "non-routable" type is any type which will not be forwarded by a router (e.g. NNL, for example, is a non-routable type); and (5) An OWL network should not be. installed so that two IP subnets are bridged by a radio link. For example, in FIG. 1, the spanning tree link between the AP 101 and the AP 102 should not be a radio link. Note that the AP 102 will attach to the AP 101 through its OWL/IP port, even if it has a physical radio link to the AP 101, because the cost of an IP tunnel hop is lower. In general, a path that can be bridged by single radio hop cannot include more than two IP tunnel hops and should include at least one IP tunnel hop. If IP roaming or NNL communications to a remote NNL host are not required, then each set of OWL nodes contained within an IP subnet should be configured as an independent OWL network with a unique LAN ID.

In a typical IP/ethernet environment, the ARP protocol is used to bind an ethernet address to an IP address. An ARP request packet, which contains a target IP address, is sent to the ethernet broadcast address. Each IP node on the LAN receives and examines the request. The node designated by the target IP address will return the ARP response packet, which contains its unicast ethernet address. If the target IP node is mobile, then the request must be flooded over a radio link(s) and, possibly, through an IP tunnel to reach the mobile node.

However, in many enterprise network installations, it may prove undesirable to flood ARP requests over radio links and tunnel links for several reasons. The most obvious reason is that it adds broadcast traffic, which has added overhead on radio links. In addition, in a typical mobile node, the radio module interrupts its host processor when a frame is received with the unicast destination address of the mobile node or a broadcast destination address. If the mobile node contains power-management logic, then the host processor may be "sleeping" when a received frame arrives. If the radio module is enabled to receive broadcast ARP requests, for example, then the host processor will constantly be interrupted and awakened. On a busy IP LAN, the mobile node would almost never sleep. Among other reasons, flooding through a tunnel link also circumvents the ability of routers to contain traffic within LAN segments.

In some cases, a proxy ARP server can be used to reduce or eliminate the need to flood ARP requests to mobile nodes through an IP tunnel or radio port. (Note that filters can be used to reduce non-ARP broadcast traffic.) The proxy ARP server exists on each AP which can bridge to an ethernet port. If the server is enabled, it maintains an ARP database, where each entry in the database contains a status, an age, and an IP address/ethernet address pair. Each address pair designates an IP node which is on the server's IP subnet. The status value can be "PROXY", "LOCAL", or "PENDING". If the status is PROXY, then the server is servicing ARP requests for the associated IP node, which is in the OWL sub tree rooted at the AP. If the status is LOCAL, then the server has learned that the target IP node is on the local ethernet link. A PENDING entry is created when an ARP request is received and the server does not have an entry for the target node. The age in an entry is set to 0 when the entry is created or updated, and is incremented once a minute. Entries in the database are indexed by the IP address and by the ethernet address.

The AP bridging module calls the ARP server each time an ARP request is received, and passes a pointer to the ARP packet. The ARP server returns a value to the bridging module which indicates if the request should be forwarded or discarded. There are two general cases—the request frame can either be received on an "inbound" link or an "outbound" link. A link is inbound if the AP is attached to the link through its root port; otherwise, it is outbound. In the special case of the root AP, the primary LAN is considered an inbound link. If an ARP request is received on an inbound link and the server has a PENDING entry, for the target IP address, then it indicates that the request should be flooded (i.e. outbound); otherwise, it indicates that it should be discarded. If the server does not have an entry, a PENDING entry is created. Note that if the server receives another ARP request with the same target IP address, it will indicate that the request should be forwarded. If an ARP request is received on an outbound link and the server does not have an entry or has a LOCAL, then it indicates that the request should be forwarded inbound only, and a PENDING entry is created. If the server has a PENDING entry, then it indicates that the request should be flooded (i.e. forwarded inbound and, possibly, to other outbound ports). In either case, if the server has a PROXY entry for the target IP address, then the server will transmit a "proxy" ARP response, which contains the ethernet address of the associated IP node, and indicate that the frame should be discarded.

In an exemplary embodiment, the server follows the rules listed below to maintain its ARP database and forward ARP request packets. Note that the database can contain only one entry per IP address; therefore, before an entry is "created" any existing entry must be deleted. In this discussion, a "route" can be a route table entry or a "secondary" entry in the AP bridge table. If the server indicates that an ARP request should be forwarded, then it is flooded according to ARP and multicast flooding configuration parameters.

(1) The ARP database is tightly coupled with routing tables in the AP. The ARP database cannot contain a PROXY entry for a node, unless the node is in the spanning tree rooted at the AP. Therefore, a PROXY entry cannot be created unless the AP has a route to the node. A PROXY entry is deleted if the route to a node is deleted.

(2) The server in the root AP or in the designated AP for a secondary ethernet LAN, cannot create a PROXY entry for a node if the route to the node is "distributed". (A route is "distributed" if the first hop to the node is through an AP on the same ethernet link, which is responsible for bridging frames to/from the ethernet link from/to the node.)

(3) The ARP database is never updated with an IP address which belongs to another subnet. The ARP server always indicates that an ARP request should be discarded if either the target or source IP address belongs to a subnet which is not the same as the subnet of the AP.

(4) If the server receives an ARP response packet on a non-ethernet port, it creates a PROXY entry for the target IP node (i.e. the node which generated the response), if the AP has a consistent non-distributed route to the node. If the route is distributed, a LOCAL entry is created.

(5) If the server receives an ARP request packet on a non-ethernet port, it creates a PROXY entry for the source IP node (i.e. the node which generated the request), if the AP has a consistent non-distributed route to the node. If the route is distributed, a LOCAL entry is created.

(6) An IP node in the OWL network can explicitly register its IP address with the ARP server each time it sends an OWL ATTACH request packet. An AP creates a PROXY entry for the source node if it is responsible for bridging frames to/from the source node on its ethernet port; otherwise, if the route is distributed, it creates a LOCAL entry. The ethernet address stored in the PROXY entry is the MAC-R source address of the ATTACH request packet. The ARP database is not updated if the ATTACH request is invalid (i.e. out-of-sequence).

(7) If the server receives an ARP response packet on an ethernet port, it creates a LOCAL entry for the target IP node if it does not have an entry or if it has a LOCAL or PENDING entry. If it has a PROXY entry and the AP is not the root AP, then an ALERT request is sent to the root AP. If the path to the node has changed, the root AP will return an ALERT response to delete the old path fragment.

(8) If the server receives an ARP request packet on an ethernet port, it creates a LOCAL entry for the source IP node, if it does not have an entry or if it has a LOCAL or PENDING entry. If it has a PROXY. entry and the AP is not the root AP, then an ALERT request is sent to the root AP. If the path to the node has changed, the root AP will return an ALERT response to delete the old path fragment.

(9) LOCAL entries are aged and discarded after 30 minutes. PENDING entries are aged and discarded after 2 minutes. PROXY entries are deleted if the route to the associated node changes.

Figure 6:
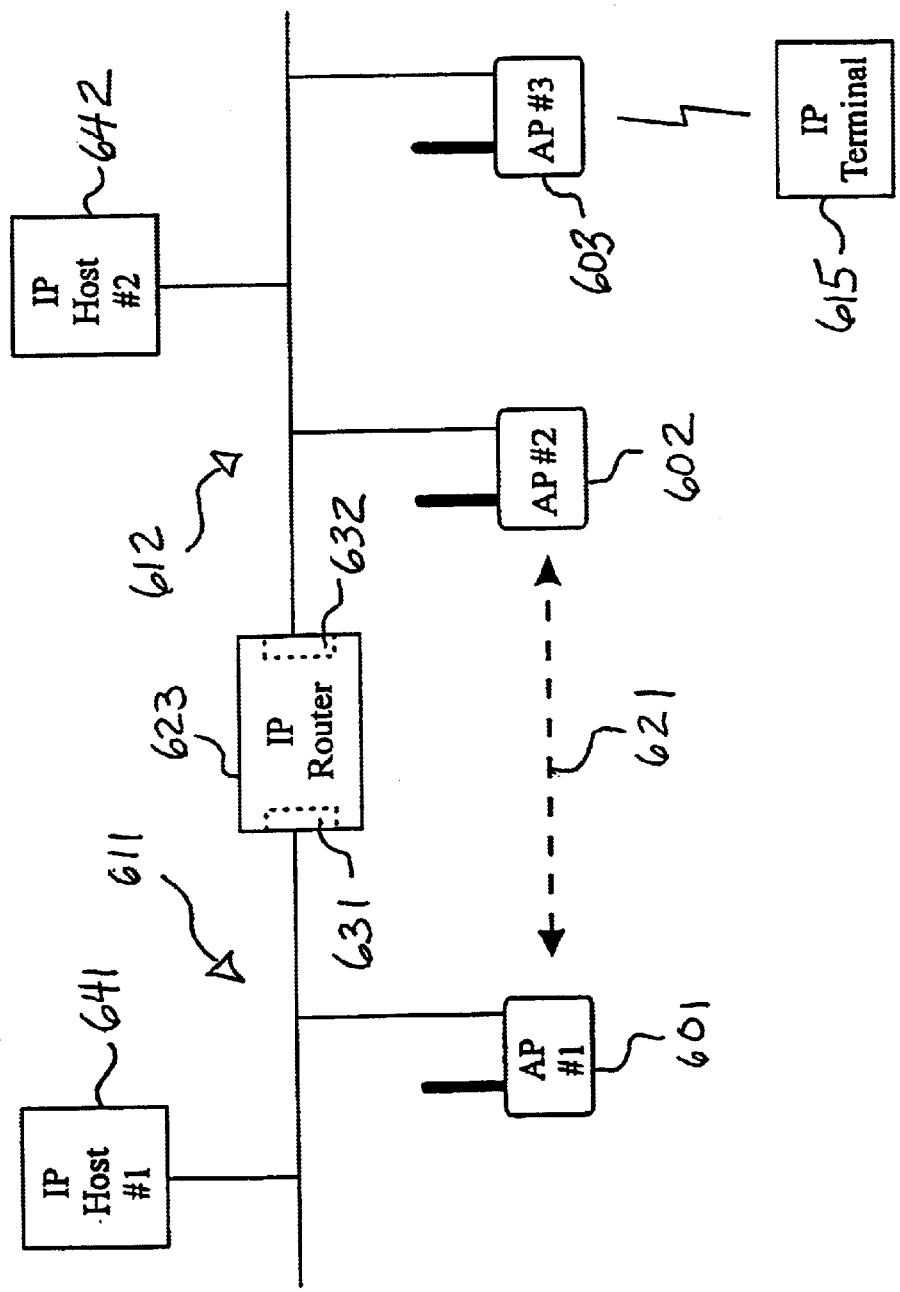
FIG. 6 is a drawing of an exemplary enterprise network used to illustrate the functionality of address resolution using ARP proxy servers in accordance with the present invention.

FIG. 6 is a drawing of an exemplary enterprise network used to illustrate the functionality of address resolution using ARP proxy servers in accordance with the present invention. A terminal 615 has an IP address for a subnet 612. Assume that the terminal 615 has either sent an inbound ARP frame or registered its IP address within an ATTACH request packet. The ARP server in an AP 603 has a PROXY entry for the terminal (assuming the AP 603 has bridging enabled). A server in an AP 602 has a LOCAL entry for the terminal 615 because the route for the terminal 615 is distributed, i.e., the AP 603 is responsible for bridging frames from ethernet to the terminal 615. A root AP 601 cannot have an entry for the terminal 615 because it is on another subnet 611. If an IP Host 642 sends a broadcast ARP request frame with the target IP address of the terminal 615, then the server in the AP 603 will generate an ARP response frame which contains the ethernet address of the terminal 615. The AP 602 will ignore the request. The path between the AP 602 and the AP 603 could contain an off-the-shelf transparent bridge. If the request is flooded inbound, any AP on the subnet 611 will also ignore the request because the target IP address is on another subnet. An IP Host 641 will initiate a conversation with the terminal 615 by sending an ARP request with a target IP address that designates port 631 on the IP router 623.

The proxy ARP server can be configured so that ARP requests are never forwarded outbound from an ethernet segment into the radio network. In this case, the server needs to have perfect knowledge of any IP nodes contained within the sub tree rooted at the AP, so that it can generate proxy ARP responses. Normally, this mode is used if all nodes in the radio network explicitly register their IP addresses.

By default, a broadcast ARP request packet, or any other broadcast packet, which originates in the radio network is forwarded inbound until it reaches the primary LAN. The multicast flooding level can be set so that broadcast frames are always flooded throughout the OWL network.

Two or more APs may generate ARP response packets for a single node, if an old path is not successfully deleted when the node roams. In this case, the forwarding database in an off-the-shelf bridge may be updated incorrectly. An equivalent problem in an OWL AP has been corrected by not submitting ARP response frames to the backward learning process. Previously, the backward learning logic in the AP assumed that a frame could not be delayed for more than 5 seconds. If an AP received a frame on the primary LAN, for example, and it had an outbound route for the source address, then it deleted the route, if the route was more than 5 seconds old. This logic fails if an AP continues to generate ARP response frames for a terminal, for some time after the terminal has roamed to another AP. To avoid incorrect updates, the filtering database and route tables in an OWL AP are not updated when a received ARP response indicates that the path to the source node may have changed. Instead, an ALERT request is generated to determine if the node has, in fact, roamed. If an ALERT response indicates that the node has roamed, then the AP will delete its PROXY server entry for the node and will no longer generate incorrect ARP responses for the node.

Figure 7:
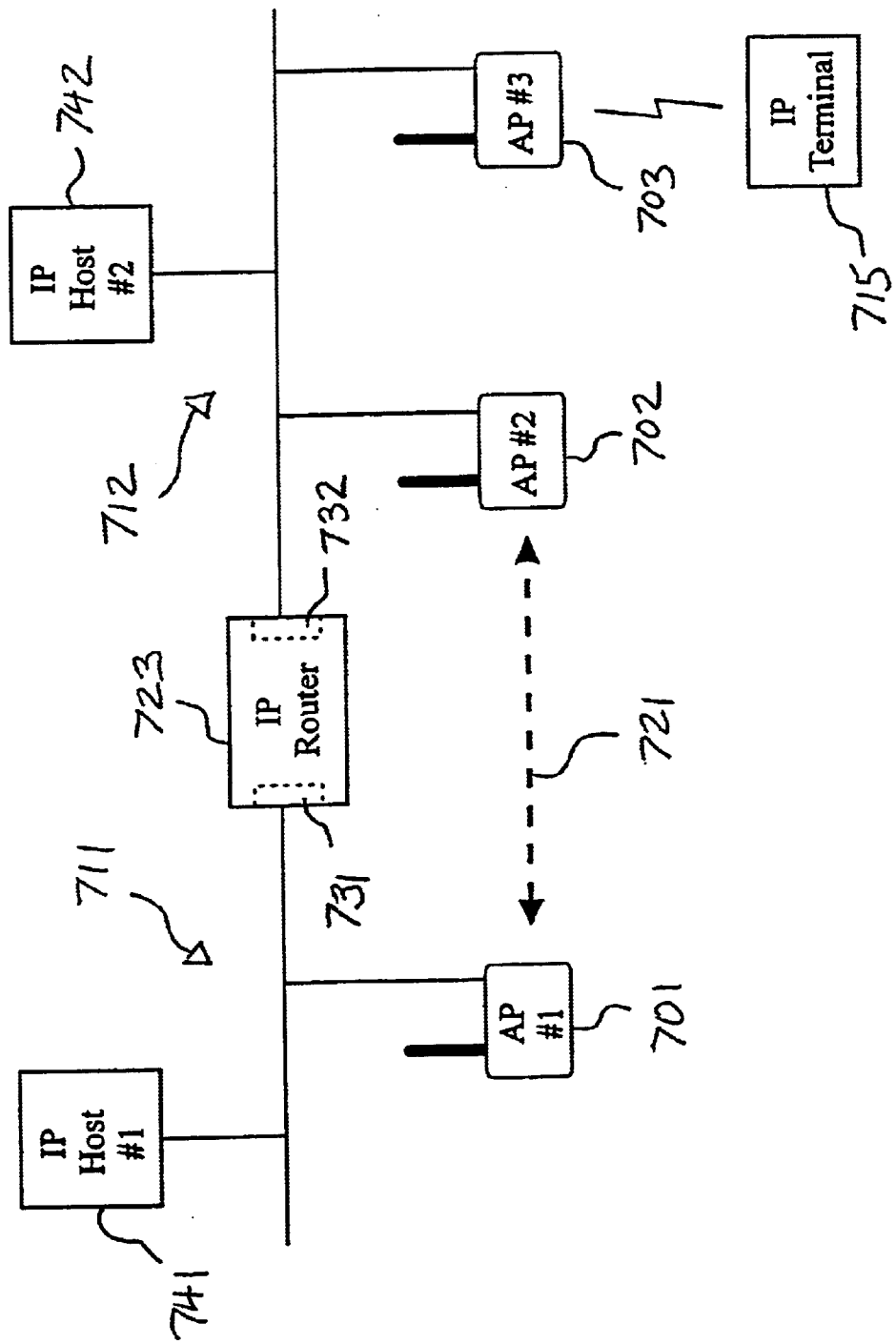
FIG. 7 is a drawing of an exemplary enterprise network used to illustrate the functionality of address resolution using ARP translation servers in accordance with the present invention.

FIG. 7 is a drawing of an exemplary enterprise network used to illustrate the functionality of address resolution using ARP translation servers in accordance with the present invention. In particular, another approach involving the use of ARP translation servers often proves to be a more desirable solution to that provided by the proxy ARP server approach of FIG. 6. The ARP translation prevents undesirable flooding of ARP requests through radio and tunnel links.

An ARP translation server operates nearly identically to the proxy ARP server discussed with reference to FIG. 6. Instead of acting as a proxy, the ARP translation server unicasts ARP requests through the wireless network. Thus, whether or not an ARP request is received on an inbound or an outbound link, the ARP translation server will translate the broadcast destination address, in the ethernet header, to the unicast ethernet address of the target node, if the ARP translation server has PROXY entry for the target IP address. The unicast frame is then routed through the OWL network to the target node so that the target node can return an ARP response packet.

In the exemplary enterprise network of FIG. 7, a terminal 715 has an IP address for a subnet 712. Assume that the terminal 715 has either sent an inbound ARP frame or registered its IP address within an ATTACH request packet. The ARP server in an AP 703 has a PROXY entry for the terminal (assuming the AP 703 has bridging enabled). A server in an AP 702 has a LOCAL entry for the terminal 715 because the route for the terminal 715 is distributed, i.e., the AP 703 is responsible for bridging frames from ethernet to the terminal 715. A root AP 701 cannot have an entry for the terminal 715 because it is on another subnet 711. If an IP Host 742 sends a broadcast ARP request frame with the target IP address of the terminal 715, then the server in the AP 703 will translate the broadcast destination address, in the ethernet header, to the unicast ethernet address of the target node, the IP terminal 715. The unicast frame is then transmitted to the IP terminal 715. The IP terminal 715 responds with an ARP response packet which is a unicast packet directed to the IP host 742 via the AP 703.

Thus, unlike the proxy ARP server approach, the ARP translation server approach does not require the server to have perfect knowledge of the IP nodes contained within the sub-tree at the corresponding AP. Instead, the ARP translation server merely directing (unicasting) the ARP request when it believes an IP node is contained within its subtree. Whether or not this is true does not matter because the IP node will only respond with an ARP response if it is present and has not roamed.

Although FIGS. 1–2 and 4–7 are diagrams with simplistic network configurations with a single wireless hop to a terminal, the aforementioned features and functionality can also be applied to more complex configurations including enterprise networks with multiple wireless hopping pathways to such terminals.

Figure 8A:
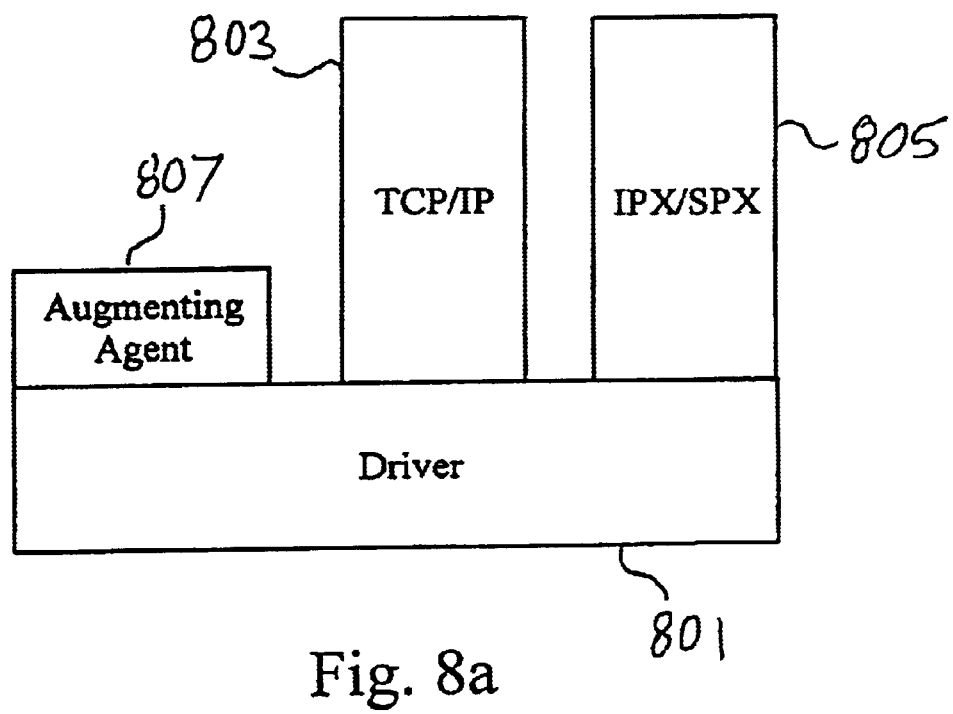
FIG. 8a is a drawing illustrating operation of an augmenting agent built in accordance with the present invention which supplements off-the-shelf protocol stacks to support various enhanced features that may prove desirable in specific enterprise network configurations.

FIG. 8a is a drawing illustrating operation of an augmenting which supplements off-the-shelf protocol stacks to support various enhanced features. A typical off-the-shelf protocol stack would include a proprietary or defacto industry standard driver 801, which provides a MAC layer interface to higher level protocol layers such as TCP/IP 803 or IPX/SPX 805. Exemplary MAC layer interfaces are defined by industry standards such as ODI (open data link interface) or NDIS (network device interface specification) among others.

Using a conventional approach to enhance functionality, higher level layers of the protocol stack such as the TCP/IP 803 or the IPX/SPX 805 would be modified creating potential incompatibility and duplicity in efforts. Instead, an augmenting agent 807 has been added to interface with the off-the-shelf protocol stacks to provide the enhanced features of an enterprise network built in accordance with the present invention, without requiring modification to the off-the-shelf protocol stacks. The augmenting agent 807 is placed as an independent application to monitor the interface between the driver 801 and the higher layer protocols, e.g. TCP/IP 803 and the IPX/SPX 805.

Figure 8B:
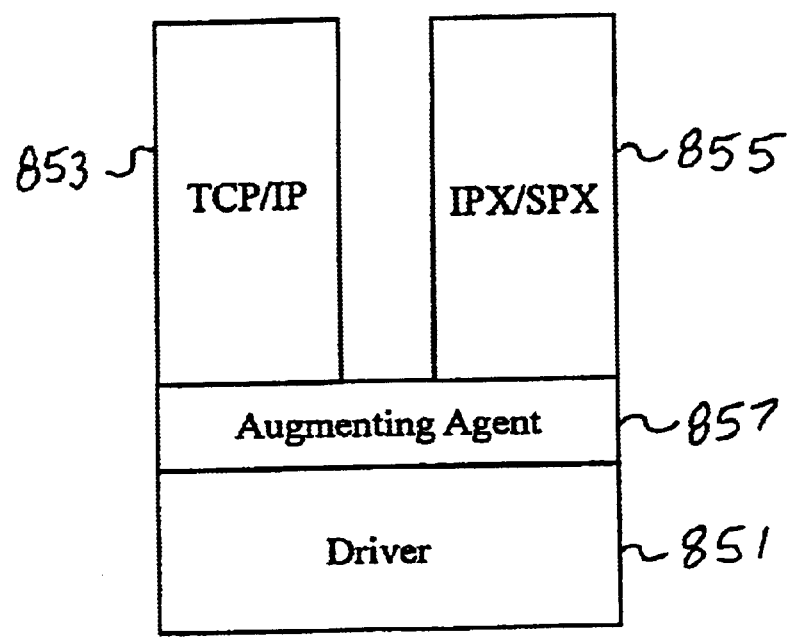
FIG. 8b is a drawing illustrating an alternate implementation of the augmenting agent of FIG. 8a wherein, instead of operation as an independent, monitoring application, the augmenting agent operates as a shim between the proprietary or defacto industry standard drivers and the higher level protocols.

FIG. 8b is a drawing illustrating an alternate implementation of the augmenting agent of FIG. 8a wherein, instead of operation as an independent, monitoring application, the augmenting agent operates as a shim between the driver and the higher level protocols. Specifically, a proprietary or defacto industry standard driver 851 interfaces with protocols TCP/IP 853 and IPX/SPX 855 via the augmenting agent 857. Although the augmenting agent may intercept all intended exchanges between the driver 851 and the protocols 853 and 855, the augmenting agent 857 need only intercept those exchanges necessary to provide the desired enhanced functionality. The driver 851 is unaware of the existence of the augmenting agent 857 as are the protocol layers 853 and 855. Such is the case in FIG. 8a as well.

The functionality described above regarding ARP registration is carried out by an augmenting agent. Other functionality that might be added through the augmenting agent includes, for example: (1) encypherment/encryption; (2) device authentication; (3) global network configuration; (4) diagnostics such as loop-back testing, signal strength feedback, wireless retry counts, network route tracing, network management via SNMP agent functionality; and (5) filtering and flooding restrictions. Thus, using the augmenting agent, these and other enhanced functions can be added transparent to a given proprietary protocol stack.

Figure 9:
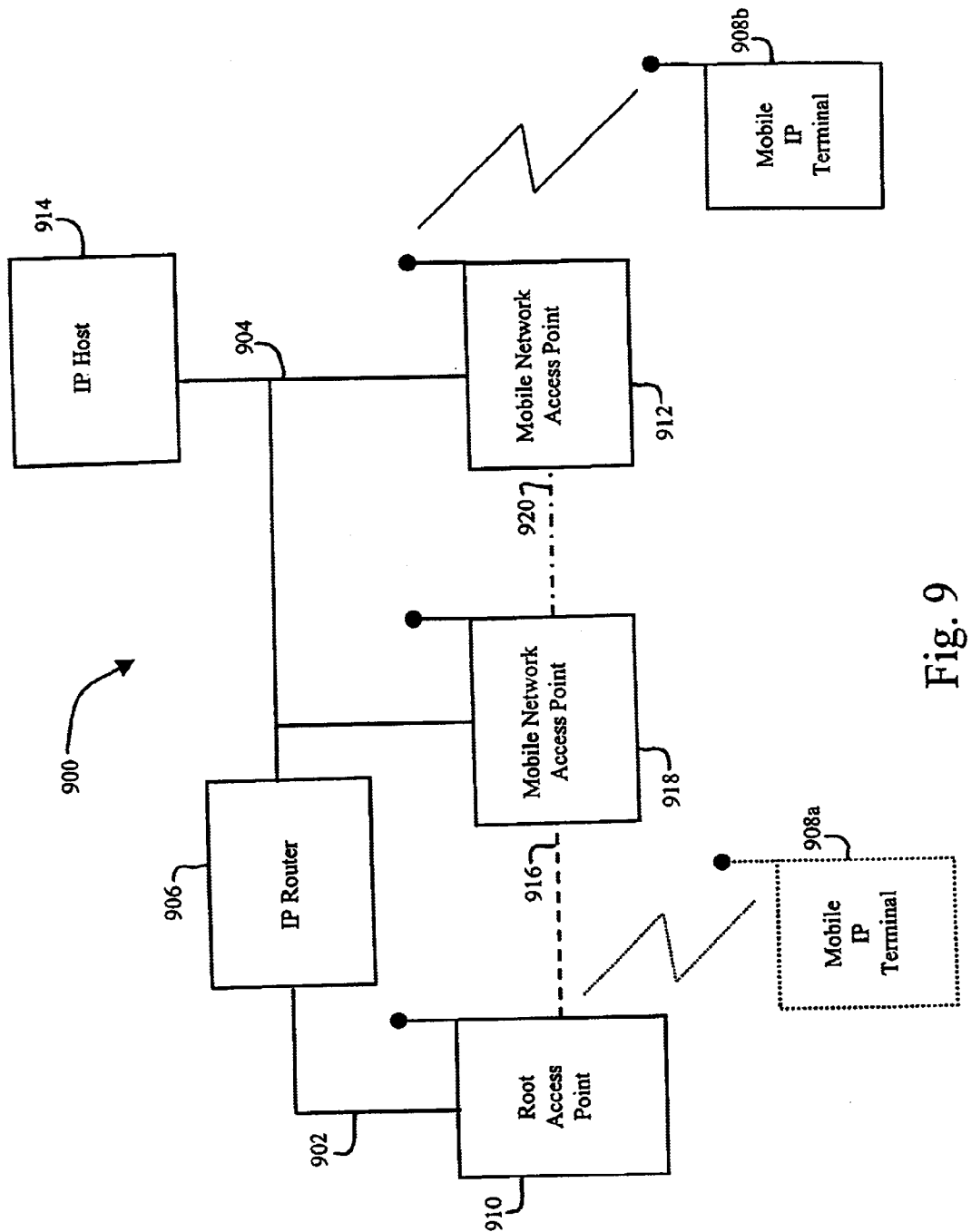
FIG. 9 is a block diagram of a communication system illustrating the use of an IP tunnel and a data link tunnel to access a roaming terminal in accordance with the invention.

FIG. 9 is a block diagram of a communication system illustrating the use of an IP tunnel and a data link tunnel to access a roaming terminal in accordance with the invention. A network 900 comprises two subnets 902 and 904. A router 906 connects the subnets 902 and 904. A mobile IP terminal 908a originally contacts the network 900 through a root access point (API) 910 of a wireless network, such as an OWL network. As shown, the root access point 910 is a part of the subnet 902. The mobile IP terminal has a wired network address respective to the root access point 910.

The mobile IP terminal 908a subsequently roams, shown as the mobile IP terminal 908b has moved. The mobile IP terminal 908b now contacts the network 900 through another access point 912 of the OWL network. The access point 912 is part of the subnet 904.

An IP host 914 communicates with the IP terminal 908 through the root access point 910 by the methods described previously in this specification. To access the mobile IP terminal 908, the IP host 914 directs data to the root access point 910 through the router 906. An IP tunnel 916 is created between the root access point 910 and another access point 918 for the subnet 904. The access point 918 serves as a root access point for other wireless access points in the subnet 904.

The access points 918 and 912 are nodes in an OWL network. Thus, the root access point 910 may transmit OWL packets through the IP tunnel 916 to the mobile IP terminal 908.

In order to facilitate faster access to the mobile IP terminal 908 through the access point 912, a data link tunnel 920 is created between access point 912 and the access point 918. This data link tunnel enables data to flow from the access point 918 to the access point 912, where it is forwarded to the mobile IP terminal 908. The data link tunnel allows the data to be passed between the access point 918 and the access point 912 without the necessity of bridging the data onto the subnet 904. Thus, the IP host 914 can communicate with the mobile IP terminal 908 without having to bridge the data onto the subnet 904 after the data reaches the access point 918.

To communicate with the mobile IP terminal 908, the IP host 914 sends a packet addressed to the mobile IP terminal 908. The IP host 914 forwards the packet to the router 906, where the router 906 forwards the packet from the IP host 914 to the subnet 902.

There, the root access point 910 forwards the data packet to the access point 918 via the IP tunnel 916. The access point 918 then forwards the packet to access point 912 via the data link tunnel 920. The data link tunnel enables the access point 918 to pass data to the access point without bridging the data packet onto the subnet 904. Thereafter, the access point 912 directs the data packet to the mobile IP terminal 908.

More specifically, the mobile IP terminal 908 is connected to an OWL network, in this case consisting of the root access point 910 and the access point 918 that serves as a root for the subnet 904. The subnet 904 connects the third access point 912 to the access point 912 in the OWL network. The connection between the access point 918 and the access point 912 may be via a wired or wireless connection.

The mobile IP terminal 908b has a wired network address relative to the root access point 910. The mobile IP terminal 908b wanders from position 908a and connects to the the network 900 via the access point 912. Assume that the IP host 914 sends a packet of data directed to the mobile IP terminal 908b. Initially, the IP host 914 sends an IP packet to the root access point 910 via the router 906 using the IP address of the IP terminal 908b. Upon receipt, the root access point 910 encapsulates the IP packet in an OWL packet. The root access point 910 encapsulates the resulting OWL packet within another IP packet addressed to the access point 918. The IP packet is then sent to the access point 918 via the IP tunnel 916.

The access point 918 de-encapsulates the original IP data and re-encapsulates the IP data in an OWL data frame. The access point 918 then forwards the re-encapsulated packet to the access point 912 through data link tunnel 920. The access point 912 de-encapsulates the original IP data and forwards it to the mobile IP terminal 908.

The data link tunnel 920 is established by disabling bridging on the access point 918. When bridging is disabled, no data is bridged onto the subnet 904.

Figure 10:
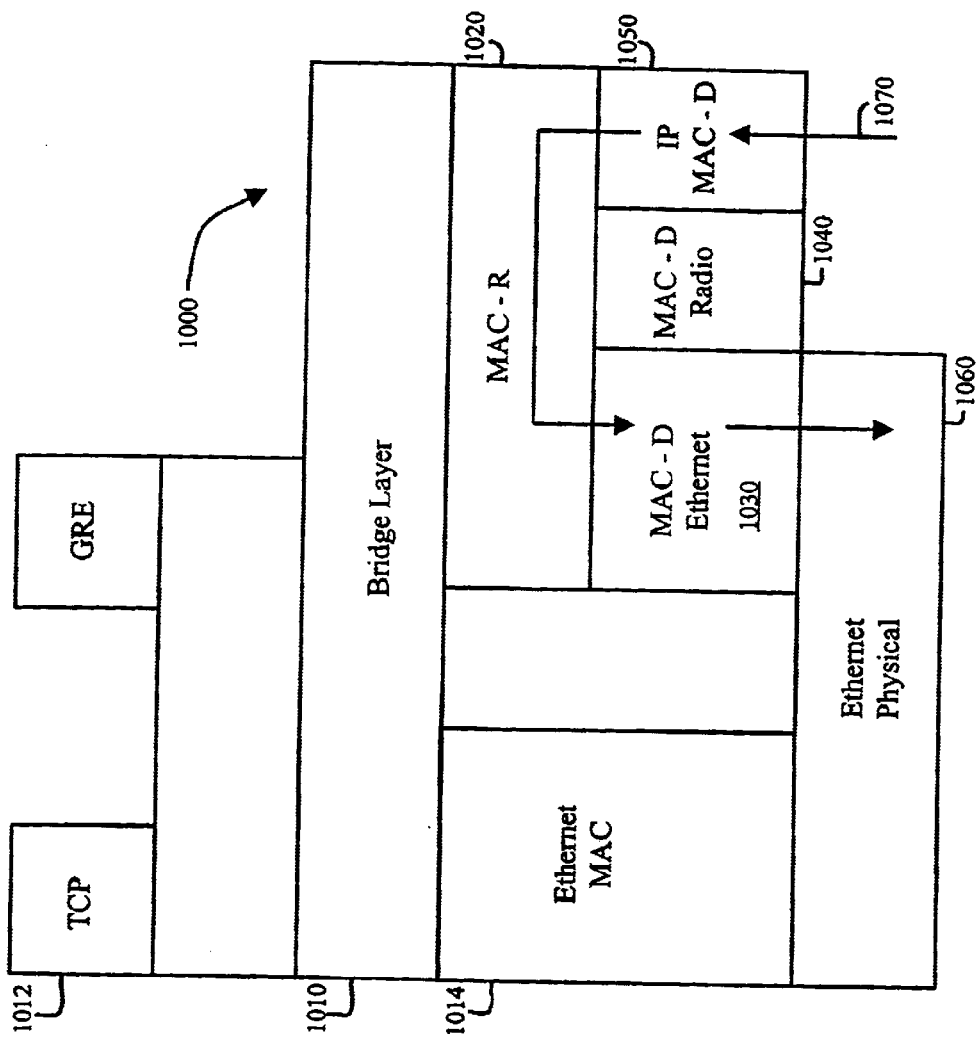
FIG. 10 is a drawing illustrating a protocol stack associated with the access point at the endpoints of the IP tunnel and the data link tunnel in FIG. 9.

FIG. 10 is a drawing illustrating an exemplary protocol stack associated with the access point at the endpoints of the IP tunnel and the data link tunnel illustrated in FIG. 9. When a bridging protocol 1010 is disabled, any incoming packets of data cannot flow through the bridging layer 1010 to a TCP layer 1012 or to an ethernet MAC layer 1014.

When the bridging protocol 1010 is disabled, the data packets must flow through the MAC-R protocol layer 1020. The packets then flow to the various MAC-D protocols, such as a MAC-D ethernet layer 1030, a MAC-D radio layer 1040, and an IP MAC-D protocol layer 1050.

A line 1070 in FIG. 10 illustrate the paths an IP data packet destined to the mobile IP terminal 908 can take through the protocol stack 1000 in access point 918 when the data link tunnel 920 is activated. Line 1070 illustrates the path the IP data packet takes when access point 918 connects to access point 912 via an ethernet link. In this case, the packet enters the protocol stack 1000 through the IP MAC-D protocol layer 1050. This corresponds to the data packet entering the access point 918 via the IP tunnel 916. The MAC-R protocol layer 1020 then processes the data packet. Since bridging on the access point 918 has been disabled, the data packet need not enter the bridging protocol layer 1010. The MAC-R protocol layer 1020 turns the processing of the data over to the MAC-D ethernet protocol layer 1030 for processing. The MAC-D ethernet protocol layer 1030 then formats the data packet for transmission to the access point 912 via an ethernet physical protocol layer 1060.

Figure 11:
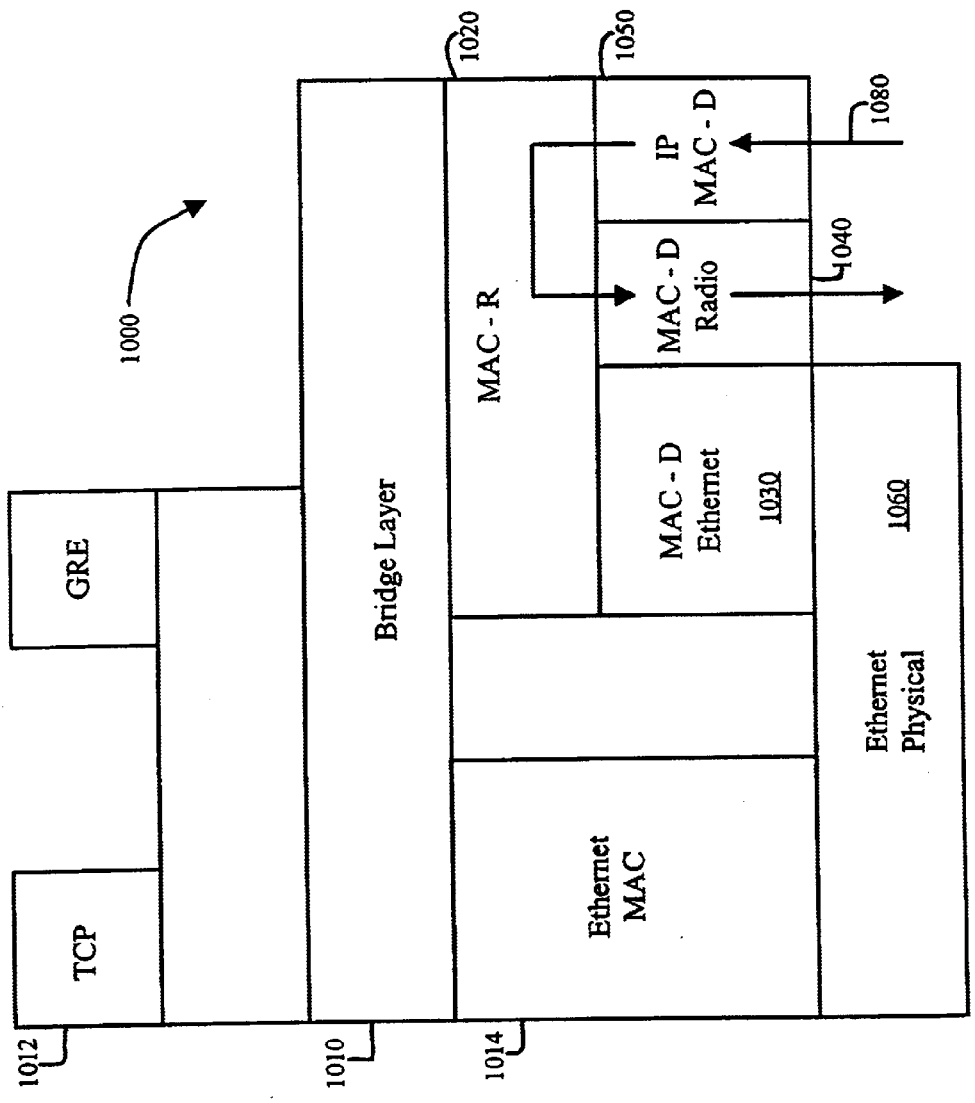
FIG. 11 is another drawing illustrating a protocol stack associated with the access point at the endpoints of the IP tunnel and the data link tunnel in FIG. 9.

FIG. 11 is a drawing illustrating an exemplary protocol stack associated with the access point at the endpoints of the IP tunnel and the data link tunnel illustrated in FIG. 9. A line 1080 illustrates the path of the packet through the protocol stack 1000 when access point 912 connects to access point 918 via a radio link. As before, the IP data packet enters the protocol stack through the IP MAC-D protocol layer. The data packet is then processed by the MAC-R protocol layer 1020. The data packet is then turned over to the MAC-D radio protocol layer for transmission to access point 912.

Note that in both cases, the encapsulated IP packet did not cause access point 918 to bridge the data onto the subnet 904 during the transfer of the IP packet to the access point 912.

Thus, the access points 912 and 918 serve as logical extensions of the subnet 902. A home subnet, such as the subnet 902, can be transparently extended into an enterprise IP network, such as network 900, by concatenating data link tunnels, such as the data link tunnel 920, to an existing IP tunnel, such as IP tunnel 916. The data link tunnels prevent frames passing through an IP tunnel from one IP subnet to another from being bridged onto the second subnet.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A communication network providing wireless communication within a premises, the wireless network comprising:
    a wired network operating according to a wired protocol, the wired network having a first network segment and a second network segment;
    a wireless terminal having a wired network protocol address;

a first access point coupled to the first network segment;

a second access point coupled to the first network segment; and a data link tunnel that communicatively couples the second access point to the first access point when the wireless terminal is in wireless communication with the second access point, wherein the wired network protocol address of the wireless terminal is respective to the second network segment, and a message including original data for the wireless terminal is directed to the wired network address respective to the second network segment when the wireless terminal has roamed to the first network segment, the second network segment encapsulating the message including the original data in a packet for transmission to the first access point, and the first access point encapsulating the message including the original data in a packet for transmission via the data link tunnel to the second access point of the first network segment, such that the original data is supplied to the wireless terminal without use of pseudo addresses or new local addresses which are dynamically assigned to roaming terminals.

2. The communication network of claim 1 wherein the first access point has a bridge layer for coupling messages to the first network segment, and the encapsulated message sent by the first access point bypasses the bridge layer for faster access to the wireless terminal.

3. The communication network of claim 1 wherein the data link tunnel comprises a wireless link between the first access point and the second access point.

4. The communication network of claim 1 wherein the second access point de-encapsulates the original data and forwards it to the wireless terminal.

5. The communication network of claim 1 wherein the first access point is connected to the first network segment.

6. The communication network of claim 5 wherein a protocol tunnel communicatively couples the first access point to the second network segment.

7. The communication network of claim 6 further comprising a third access point connected to the second network segment.

8. The communication network of claim 7 wherein the wireless terminal has a wired network protocol address respective to the third access point.

9. The communication network of claim 8 wherein the first access point and the third access point are communicatively coupled with a protocol tunnel.

10. The communication network of claim 9 wherein routed communication through the data link tunnel uses a different protocol scheme than when routed through the protocol tunnel.

11. The communication network of claim 1 wherein the wired network operates under the Internet protocol.

12. The communication network of claim 1 wherein the data link tunnel operates across the wired network.

13. The communication network of claim 1 wherein the data link tunnel operates across a radio link.

14. The communication network of claim 1 wherein routed communication from the first tunnel is not bridged onto the first network segment.

15. A communications network comprising:

a wired network operating according to a wired network protocol, the wired network having a first network segment and a second network segment;

a first wireless access point connected to the first network segment;

a second wireless access point connected to the second network segment;

a wireless node having a wired network protocol address respective to the first wireless access point, and capable of roaming to the proximity of a remote wireless access point connected to the second network segment; and means for routing communications via a protocol tunnel from the first wireless access point to the second wireless access point across the wired network when the wireless node has roamed to the proximity of such a remote wireless access point connected to the second network segment and is in communication with such remote wireless access point, and means for providing a logical extension to the remote wireless access point while allowing the wireless node to retain its wired network protocol address, and without requiring the use of pseudo addresses or new local addresses assigned dynamically to roaming wireless terminals.

16. The communications network of claim 15, the wired network operating according to an Internet Protocol.

17. The communications network of claim 15, wherein the first wireless access point originates the protocol tunnel.

18. The communications network of claim 15, wherein the second wireless access point originates the protocol tunnel.

19. The communications network of claim 15, further comprising a router that couples the first network segment to the second network segment.

20. The communications network of claim 15, wherein the first network segment and the second network segment have different subnetwork addresses.

21. The communications network of claim 15, with the remote access point comprising a third access point connected to the second network segment; and the protocol tunnel routing communications from the first wireless access point to both the second wireless access point and the third access point across the wired network when the wireless node is in communication with the third wireless access point.

22. The communications network of claim 15, wherein communications through the protocol tunnel are limited based upon communication type.

23. The communications network of claim 15, wherein address resolution packets are selectively passed through the protocol tunnel.

24. The communications network of claim 15, wherein communications through the protocol tunnel are reordered upon receipt based upon an original ordering.

25. In a communications network comprising:

a wired network operating according to a wired network protocol, the wired network having a first network segment and a second network segment with respective access points connected thereto;

a wireless node having a wired network protocol address respective to a first wireless access point of the first network segment; the method of enabling roaming of the wireless node into proximity to a remote wireless access point of the second network segment while maintaining communications;

said method comprising the step for routing communications via a protocol tunnel from the first wireless access point to a second wireless access point of the second network segment across the wired network when the wireless node has roamed to the proximity of a remote wireless access point of the second network segment and is in communication with such remote wireless access point, and the step for routing communication from the second wireless access point to the remote wireless access point via a data link tunnel, without requiring the wireless node to obtain a new local address, and without the use of pseudo addresses dynamically assigned to roaming terminals.

26. The method of claim 25, wherein the wired network operates according to an Internet Protocol.

27. The method of claim 25, wherein the first wireless access point originates the protocol tunnel.

28. The method of claim 25, wherein the second wireless access point originates the protocol tunnel.

29. The method of claim 25, wherein a router couples the first network segment to the second network segment.

30. The method of claim 25, wherein the first network segment and the second network segment have different subnetwork addresses.

31. The method of claim 25, further comprising routing communications from the first wireless access point to both the second wireless access point and a third wireless access point across the wired network when the wireless node is not in communicative proximity to a wireless access point of the first network segment, and is in communication with the third wireless access point.

32. The method of claim 25, wherein communications through the protocol tunnel are limited based upon communication type.

33. The method of claim 25, wherein address resolution packets are selectively passed through the protocol tunnel.

34. The method of claim 25, wherein communications through the protocol tunnel are reordered upon receipt based upon an original ordering.

* * * * *